(12) United States Patent
Wang et al.

(10) Patent No.: US 11,799,724 B2
(45) Date of Patent: Oct. 24, 2023

(54) INTERNET-OF-THINGS MODEL-BASED VIRTUAL INTERNET-OF-THINGS DEVICE GENERATION METHOD AND APPARATUS

(71) Applicant: Siemens Aktiengesellschaft, Munich (DE)

(72) Inventors: Qi Wang, Wuhan (CN); He Yu, Wuxi (CN); Jun Jie Chen, Wuxi (CN); Wen Jing Zhou, JiangSu (CN); Yue Hua Zhang, Wuhan (CN); Teng Fei Wu, JiangSu (CN); Yang Wang, Wuxi (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/764,811

(22) PCT Filed: Sep. 29, 2019

(86) PCT No.: PCT/CN2019/109239
§ 371 (c)(1),
(2) Date: Mar. 29, 2022

(87) PCT Pub. No.: WO2021/056586
PCT Pub. Date: Apr. 1, 2021

(65) Prior Publication Data
US 2022/0337476 A1 Oct. 20, 2022

(51) Int. Cl.
*H04L 41/084* (2022.01)
*H04L 41/0895* (2022.01)
(Continued)

(52) U.S. Cl.
CPC ........ *H04L 41/084* (2013.01); *H04L 41/0806* (2013.01); *H04L 41/0895* (2022.05); *H04L 43/50* (2013.01)

(58) Field of Classification Search
CPC .............. H04L 41/084; H04L 41/0806; H04L 41/0895; H04L 43/50; H04L 67/10; H04L 67/12; H04L 67/34
See application file for complete search history.

(56) References Cited

U.S. PATENT DOCUMENTS 8,512,143 B2 * 8/2013 Jung .................... G06N 3/006
715/745
2016/0359664 A1 12/2016 Malegaonkar .......... H04L 12/24
(Continued)

FOREIGN PATENT DOCUMENTS

| CN | 104640237 | 5/2015 | ............ H04W 84/18 |
| CN | 106484544 | 3/2017 | ............... G06F 9/54 |
| CN | 109787826 | 5/2019 | ............. H04L 12/24 |

OTHER PUBLICATIONS

Search Report for International Application No. PCT/CN2019/109239, 8 pages, dated Jun. 23, 2020.
(Continued)

*Primary Examiner* — Michael Won
(74) *Attorney, Agent, or Firm* — Slayden Grubert Beard PLLC

(57) ABSTRACT

Various embodiments of the teachings herein include a method for generating a virtual Internet-of-things device on the basis of an Internet-of-things model. The method may include: obtaining a first number of Internet-of-things models for an Internet-of-things solution; subjecting a variable in the first number of Internet-of-things models to variable attribute expansion to add an extended variable attribute to the variable, wherein the variable subjected to variable attribute expansion is capable of data simulation; configuring variable link relations and variable link processing rules for the extended Internet-of-things models to obtain an Internet-of-things model configuration file; and obtaining a second number of virtual Internet-of-things devices on the (Continued)

basis of a virtual physical network device architecture by using the Internet-of-things model configuration file. The variable link relations include variable link relations between variables in the same Internet-of-things model and/or variable link relations between variables in different Internet-of-things models.

13 Claims, 12 Drawing Sheets

(51) Int. Cl.
*H04L 41/0806* (2022.01)
*H04L 43/50* (2022.01)

(56) References Cited

U.S. PATENT DOCUMENTS

| | | | |
|---|---|---|---|
| 2017/0054810 A1* | 2/2017 | Evans | H04L 41/145 |
| 2017/0310549 A1* | 10/2017 | Nagesh | H04L 41/0895 |
| 2018/0063250 A1* | 3/2018 | Justin | G06F 11/3058 |
| 2018/0205793 A1* | 7/2018 | Loeb | G06T 19/003 |
| 2018/0262391 A1* | 9/2018 | Jung | H04L 67/02 |
| 2020/0310394 A1* | 10/2020 | Wouhaybi | H04L 67/125 |

OTHER PUBLICATIONS

Yongan Guo et al.:"Service-Oriented Network Virtualization Architecture for Internet of Things", College of Telecommunications & Information Engineering, Nanjing University of Posts and Telecommunications, Nanjing 210003, China Jiangsu Key Lab of Wireless Communications, Nanjing University of Posts and Telecommunications , Nanjing 210003, China, Sep. 1, 2016.

* cited by examiner

INTERNET-OF-THINGS MODEL-BASED VIRTUAL INTERNET-OF-THINGS DEVICE GENERATION METHOD AND APPARATUS

CROSS-REFERENCE TO RELATED APPLICATIONS

This application is a U.S. National Stage Application of International Application No. PCT/CN2019/109239 filed Sep. 29, 2019, which designates the United States of America, the contents of which is hereby incorporated by reference in their entirety.

TECHNICAL FIELD

The present disclosure relates to the field of the Internet of things. Various embodiments of the teachings herein include methods and/or apparatuses for generating a virtual Internet-of-things device on the basis of an Internet-of-things model.

BACKGROUND

Before an Internet-of-things solution (end-to-end solution) is released as a product to end users, it is necessary to perform system testing on the entire solution, including testing of on-site sensor components, data acquisition and data processing in edge devices, connectivity to an Internet-of-things cloud platform and applications on the Internet-of-things cloud platform. In order to complete the above-mentioned testing process, the devices and components involved in the Internet-of-things solution need to operate to provide corresponding data, and communication needs to be established between edge device developers and cloud application developers, which makes the testing process complicated and expensive.

SUMMARY

Various embodiments of the teachings herein include methods and/or apparatuses for generating a virtual Internet-of-things device on the basis of an Internet-of-things model. With the method and apparatus, virtual Internet-of-things devices may be generated, the generated virtual physical devices may be deployed in a simulated environment to replace real Internet-of-things devices to generate simulated data, and the generated simulated data may be used to complete the testing of the Internet-of-things solution.

For example, some embodiments include a method for generating a virtual Internet-of-things device on the basis of an Internet-of-things model is provided, comprising: obtaining a first number of Internet-of-things models of an Internet-of-things solution; subjecting a variable in the first number of Internet-of-things models to variable attribute expansion to add an extended variable attribute to the variable, wherein the variable subjected to variable attribute expansion is capable of data simulation; configuring variable link relations and variable link processing rules for the extended Internet-of-things models to obtain an Internet-of-things model configuration file; and obtaining a second number of virtual Internet-of-things devices on the basis of a virtual physical network device architecture by using the Internet-of-things model configuration file, wherein the variable link relations include variable link relations between variables in the same Internet-of-things model and/or variable link relations between variables in different Internet-of-things models.

In some embodiments, virtual Internet-of-things devices suitable for testing of an Internet-of-things solution are generated, the virtual Internet-of-things devices can replace real Internet-of-things devices to generate simulated data, and the generated simulated data is supplied to an Internet-of-things cloud platform to complete a testing process for the Internet-of-things solution.

In some embodiments, the extended variable attribute may comprise a data read cycle, a data range, and a simulation mode.

In some embodiments, subjecting a variable in the first number of Internet-of-things models to variable attribute expansion to add an extended variable attribute to the variable may comprise: presenting a variable configuration interface that has an inherent variable attribute presentation area and an extended variable attribute input area, the inherent variable attribute presentation area presenting the inherent variable attributes of the variables in the first number of Internet-of-things models; and receiving the extended variable attributes of each variable inputted through the extended variable attribute input area, so as to realize variable attribute expansion, the expanded variable being capable of data simulation. Using these methods, variable attribute expansion may be realized by means of a graphical interface, which makes the variable attribute expansion more convenient and intuitive.

In some embodiments, the extended variable attribute may further comprise additional variable attributes, and the additional variable attributes are determined on the basis of application scenarios of virtual Internet-of-things devices. Using these methods, extended variable attributes may be adjusted according to different application scenarios of virtual Internet-of-things devices, thereby generating virtual Internet-of-things devices corresponding to different application scenarios, which makes a solution for generating virtual Internet-of-things devices according to embodiments of the present invention more adaptable to different scenarios.

In some embodiments, configuring variable link relations and variable link processing rules for the extended Internet-of-things models to obtain an Internet-of-things model configuration file may comprise: presenting a model configuration interface in response to completion of variable attribute expansion; and receiving the variable link relations and variable link processing rules for the Internet-of-things models configured through the model configuration interface, so as to obtain an Internet-of-things model configuration file. In such methods, variable link relations and variable link processing rules may be configured by means of a graphical interface, which makes the configuration of variable link relations and variable link processing rules more convenient and intuitive.

In some embodiments, the variable link relation may comprise: a one-to-many variable link relation; a one-to-one variable link relation; and/or a many-to-one variable link relation.

In some embodiments, the method may further comprise: deploying the generated second number of virtual Internet-of-things devices into a simulated environment to complete a simulation test of the Internet-of-things solution.

As another example, some embodiments include an apparatus for generating a virtual Internet-of-things device on the basis of an Internet-of-things model of an Internet-of-things solution comprising: a model acquisition unit, configured to obtain a first number of Internet-of-things models of an Internet-of-things solution; a variable attribute expansion unit, configured to subject a variable in the first number of Internet-of-things models to variable attribute expansion to add an extended variable attribute to the variable, wherein the variable subjected to variable attribute expansion is capable of data simulation; a model configuration unit, configured to configure variable link relations and variable link processing rules for the extended Internet-of-things models to obtain an Internet-of-things model configuration file; and a virtual device generating unit, configured to generate a second number of virtual Internet-of-things devices on the basis of a virtual physical network device architecture by using the Internet-of-things model configuration file, wherein the variable link relations include variable link relations between variables in the same Internet-of-things model and/or variable link relations between variables in different Internet-of-things models.

In some embodiments, the extended variable attribute comprises: a data read cycle, a data range, and a simulation mode.

In some embodiments, the variable attribute expansion unit may comprise: a variable configuration interface presenting module, configured to present a variable configuration interface that has an inherent variable attribute presentation area and an extended variable attribute input area, the inherent variable attribute presentation area presenting the inherent variable attributes of each variable in the first number of Internet-of-things models; and a variable attribute expansion module, configured to receive the extended variable attributes of each variable inputted through the extended variable attribute input area, so as to realize variable attribute expansion, the expanded variable being capable of data simulation.

In some embodiments, the extended variable attribute further comprises an additional variable attribute, and the apparatus may further comprise: an additional variable attribute determining unit, configured to determine the additional variable attributes on the basis of application scenarios of virtual Internet-of-things devices.

In some embodiments, there is a model configuration interface presenting module, configured to present a model configuration interface in response to completion of variable attribute expansion; and a model configuration module, configured to receive the variable link relations and variable link processing rules for the Internet-of-things models configured through the model configuration interface, so as to obtain an Internet-of-things model configuration file.

In some embodiments, the apparatus may further comprise: a virtual device deploying unit, configured to deploy the generated second number of virtual Internet-of-things devices into a simulation environment for a simulation test on the Internet-of-things solution.

As another example, some embodiments include a computing device comprising: at least one processor; and a memory coupled to the at least one processor, configured to store an instruction that, when executed by the at least one processor, causes the at least one processor to implement the above-described method for generating a virtual Internet-of-things device on the basis of an Internet-of-things model of an Internet-of-things solution.

As another example, some embodiments include a machine-readable storage medium storing an executable instruction that, when executed, causes the machine to implement the above-described method for generating a virtual Internet-of-things device on the basis of an Internet-of-things model of an Internet-of-things solution.

As another example, some embodiments include a computer program product physically stored on a computer-readable medium and comprising a computer-executable instruction that, when executed, causes at least one processor to implement the above-described method for generating a virtual Internet-of-things device on the basis of an Internet-of-things model of an Internet-of-things solution.

BRIEF DESCRIPTION OF THE DRAWINGS

A further understanding of the nature and advantages of various embodiments of the teachings of the present disclosure may be obtained with reference to the following drawings. In the drawings, similar components or features may be denoted by the same reference signs.

REFERENCE SIGNS IN THE DRAWINGS

Figure 1:
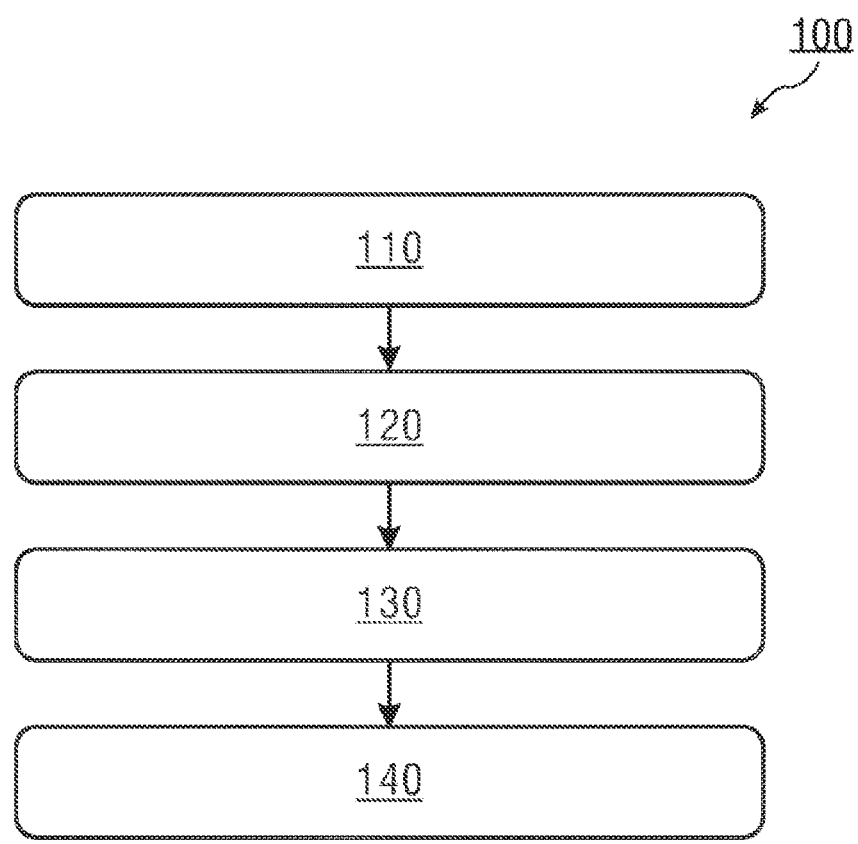
FIG. 1 is a flow chart of an example method for generating a virtual Internet-of-things device on the basis of an Internet-of-things model of an Internet-of-things solution incorporating teachings of the present disclosure.

100 Virtual Internet-of-things device generation method
110 Obtain a first number of Internet-of-things models for an Internet-of-things solution
120 Subject a variable in the first number of Internet-of-things models to variable attribute expansion
130 Configure variable link relations and variable link processing rules for the extended Internet-of-things models to obtain an Internet-of-things model configuration file 140 Obtain a second number of virtual Internet-of-things devices on the basis of a virtual physical network device architecture by using the Internet-of-things model configuration file
121 Present a variable configuration interface
123 Add an extended variable attribute to the variable through the variable configuration interface
131 Present a model configuration interface
133 Configure the variable link relations and variable link processing rules for the Internet-of-things models through the model configuration interface to obtain an Internet-of-things model configuration file
310 Feature
320 Variable
321 Name
322 Data type
323 Data unit
324 Data length
325 Default value
326 Read cycle
327 Data range
328 Simulation mode
329 Algorithm
330 Formula
510 Workstation 1
511, 521, 531 input_item
512, 522, 532 output_item
513, 523, 533 total_item
514, 524, 534 FPY
515 total_item=input_item
516 output_item=input_item
517 FPY=output_item/total_item
520 Workstation 2
530 Workstation 3
600-1, 600-2, 600-3 Virtual Internet-of-things device
610-1, 610-2, 610-3 Cloud communication module
620-1, 620-2, 620-3 Internet-of-things model variable space & message queue
630-1, 630-2, 630-3 Rule execution module
640-1, 640-2, 640-3 Data synchronization module
650-1, 650-2, 650-3 Model configuration update module
660-1 Configuration of workstation1
660-3 Configuration of workstation3
670 Cloud platform
680 Simulation data
690 Virtual Internet-of-things device space
700 Virtual device generating apparatus
710 Model acquisition unit
720 Variable attribute expansion unit
721 Variable configuration interface presenting module
723 Variable attribute expansion module
730 Model configuration unit
731 Model configuration interface presenting module
733 Model configuration module
740 Virtual device generating unit
750 Virtual device deploying unit
1000 Computing device
1010 Processor
1020 Memory
1030 Internal storage
1040 Communication interface
1060 Bus

DETAILED DESCRIPTION

The subject matter described herein will now be discussed below with reference to exemplary implementations. It should be understood that the discussion of these embodiments is only intended to allow those of ordinary skill in the art to better understand and implement the subject matter described herein, rather than limiting the scope of protection as defined by the claims, applicability, or examples. The functions and arrangements of the discussed elements may be changed without departing from the scope of protection of the present disclosure. In each example, various processes or components may be omitted, replaced, or added as needed. For example, a described method may be implemented in a sequence different from the described one, and various steps may be added, omitted, or combined. In addition, characteristics described with respect to some examples may also be combined in other examples.

As used herein, the term "comprising" and variants thereof mean open terms, meaning "including but not limited to". The term "on the basis of" means "based at least in part on". The terms "an embodiment" and "one embodiment" mean "at least one embodiment." The term "another embodiment" means "at least one other embodiment." The terms "first", "second", etc. may refer to different or the same objects. Other definitions may be included below, explicitly or implicitly. Unless clearly otherwise specified in the context, the definition of a term remains consistent throughout the description.

FIG. 1 is a flow chart of a method 100 for generating a virtual Internet-of-things device on the basis of an Internet-of-things model of an Internet-of-things solution incorporating teachings of the present disclosure. As shown in FIG. 1, at the block 110, a first number of Internet-of-things models of the Internet-of-things solution are obtained. Generally, Internet-of-things models are stored on an Internet-of-things cloud platform for use in generating an Internet-of-things solution. Thus, a first number of Internet-of-things models used by an Internet-of-things solution may be obtained from an Internet-of-things cloud platform. Here, the first number is the total number of Internet-of-things models used by the Internet-of-things solution.

After Internet-of-things models of an Internet-of-things solution is obtained, at the block 120, a variable in the first number of Internet-of-things models is subjected to variable attribute expansion to add an extended variable attribute to the variable, wherein the variable subjected to variable attribute expansion is capable of data simulation. Here, all or some of the variables in an Internet-of-things model may be subjected to variable attribute expansion.

In addition, a variable being capable of data simulation means that an extended variable can support a simulation test, which means that when a simulation test is performed, the system can generate simulation data for the variable on the basis of an extended variable attribute. Here, the variables in the first number of Internet-of-things models refers to all the variables involved in the first number of Internet-of-things models. For example, suppose the first number of Internet-of-things models include 3 Internet-of-things models, for example, Internet-of-things model 1, Internet-of-things model 2, and Internet-of-things model 3. Internet-of-things model 1 comprises variable A, variable B and variable C, Internet-of-things model 2 comprises variable B and variable D, and Internet-of-things model 3 comprises variable A, variable E and variable F, and so the variables in the first number of Internet-of-things models are variable A, variable B, variable C, variable D, variable E, and variable F. In other words, the processing in block 120 is subjecting a variable to variable attribute expansion. The specific process of variable attribute expansion will be described in detail below with reference to FIG. 2 and FIG. 3A-3C.

Figure 2:
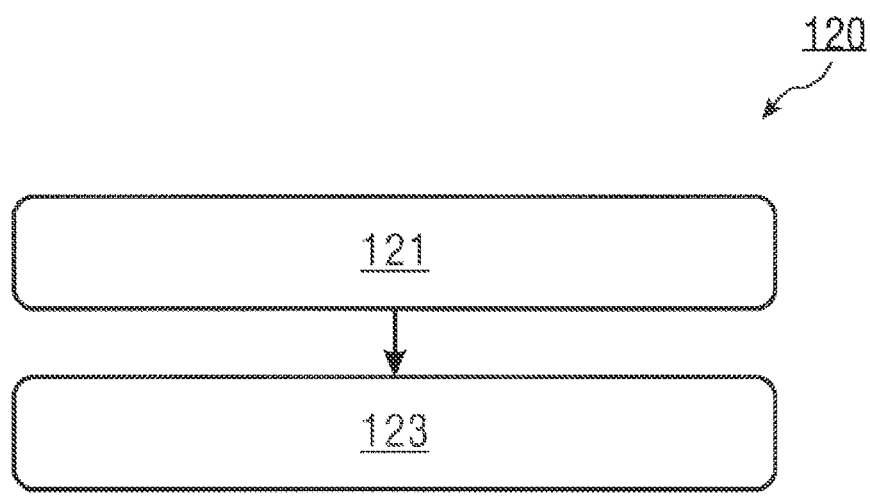
FIG. 2 is a flow chart of an example of a variable attribute expansion process incorporating teachings of the present disclosure.

FIG. 2 is a flow chart of an example of a variable attribute expansion process incorporating teachings of the present disclosure. In some embodiments, the process may include a variable configuration interface that has an inherent variable attribute presentation area and an extended variable attribute input area, the inherent variable attribute presentation area presenting the inherent variable attributes of the variables in the first number of Internet-of-things models. Here, inherent variable attributes refer to basic variable attributes needed to describe a variable in an Internet-of-things model.

Figure 3A:
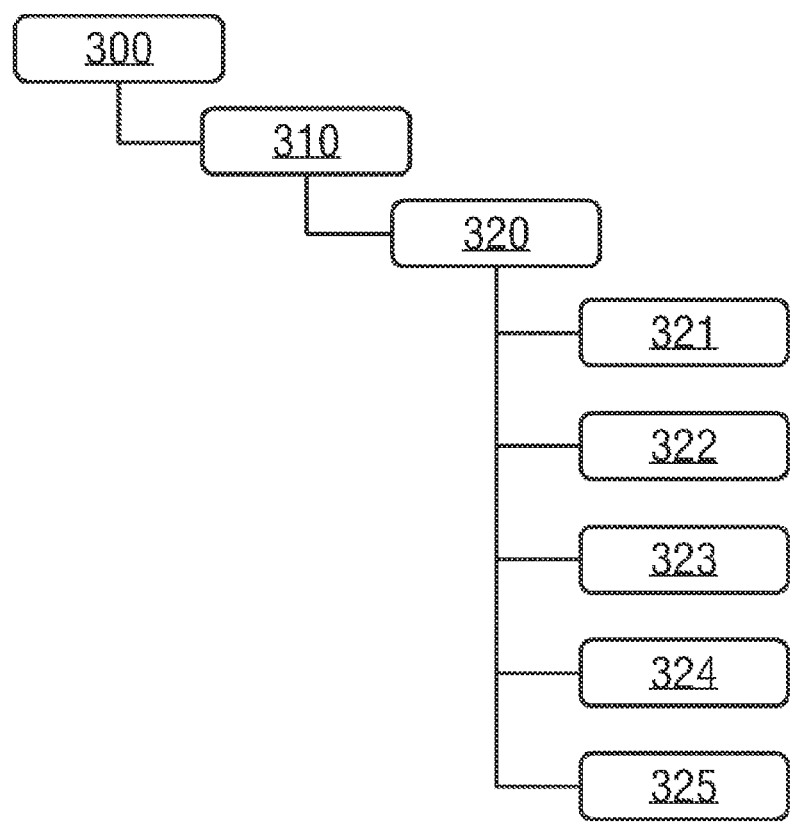
FIG. 3A is a schematic diagram of inherent variable attributes of an exemplary variable in an Internet-of-things model incorporating teachings of the present disclosure.

FIG. 3A is a schematic diagram of inherent variable attributes of an exemplary variable in an Internet-of-things model incorporating teachings of the present disclosure. As shown in FIG. 3A, the asset 300 has a feature 310. Under the feature 310, there is a variable 320. The inherent variable attributes of the variable 320 include a name 321, a data type 322, a data unit 323, a data length 324, and a default value 325.

Then, at the block 123, the extended variable attributes of the variables are input through the extended variable attribute input area to realize variable attribute expansion, the extended variable being capable of data simulation. For example, the extended variable attribute input area may be set as an editable area in which a user can edit and input an variable attribute that needs to be extended. In some embodiments, the extended variable attribute input area may be set as a drop-down menu from which a user can select a variable attribute to be extended. In some embodiments, the drop-down menu may be a preset drop-down menu with fixed variable attribute options. In some embodiments, the variable attribute options in the drop-down menu may be determined on the basis of application scenarios of virtual physical network devices. In this case, the variable attribute options in the drop-down menu are variable. With the above-described processing method, variable attribute expansion may be realized by means of a graphical interface, which makes the variable attribute expansion more convenient and intuitive.

Figure 3B:
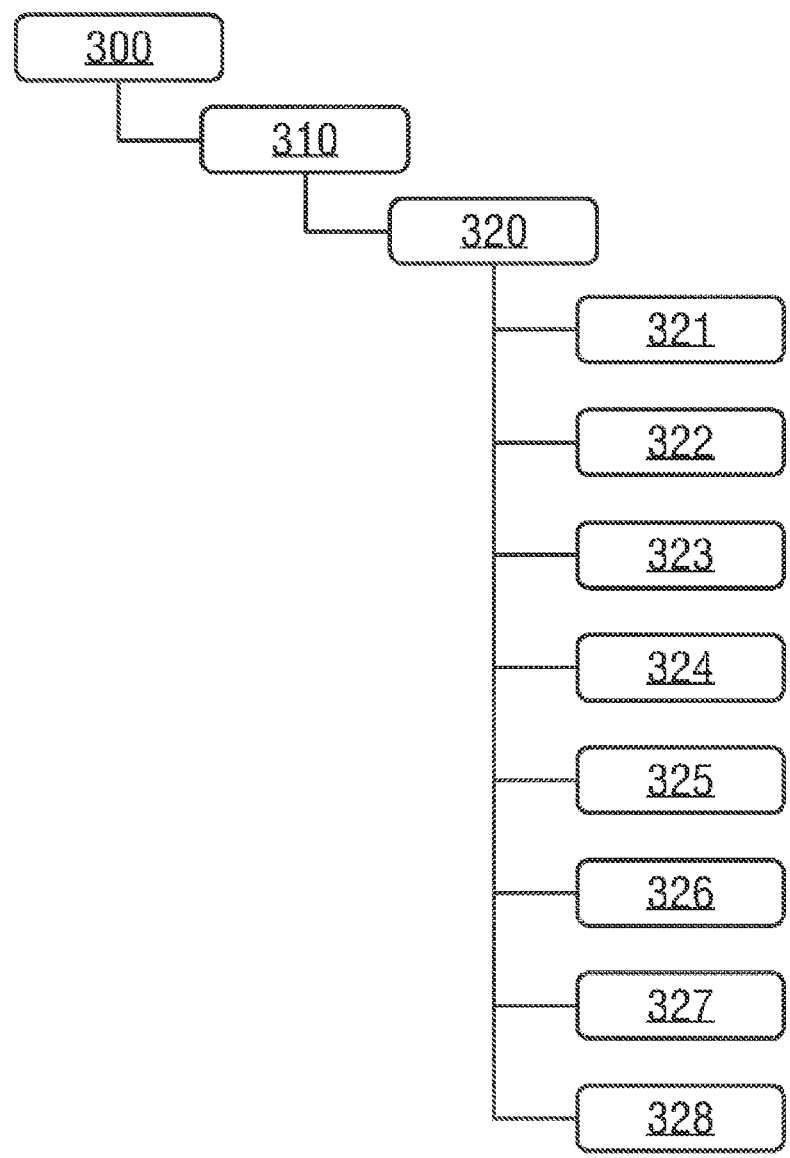
FIG. 3B is a schematic diagram of an exemplary variable in an Internet-of-things model incorporating teachings of the present disclosure.

In some embodiments, as shown in FIG. 3B, the extended variable attribute may comprise a data read cycle 326, a data range 327 and a simulation mode 328. The data read cycle 326 is used to define a frequency of data reading. The data range 327 is used to define a value range of data. The simulation mode 328 is used to define a type of data simulation, for example, random value or fixed value. In one example of the present invention, data read cycle, data range, and simulation mode may be extended variable attributes required for any variable.

Figure 3C:
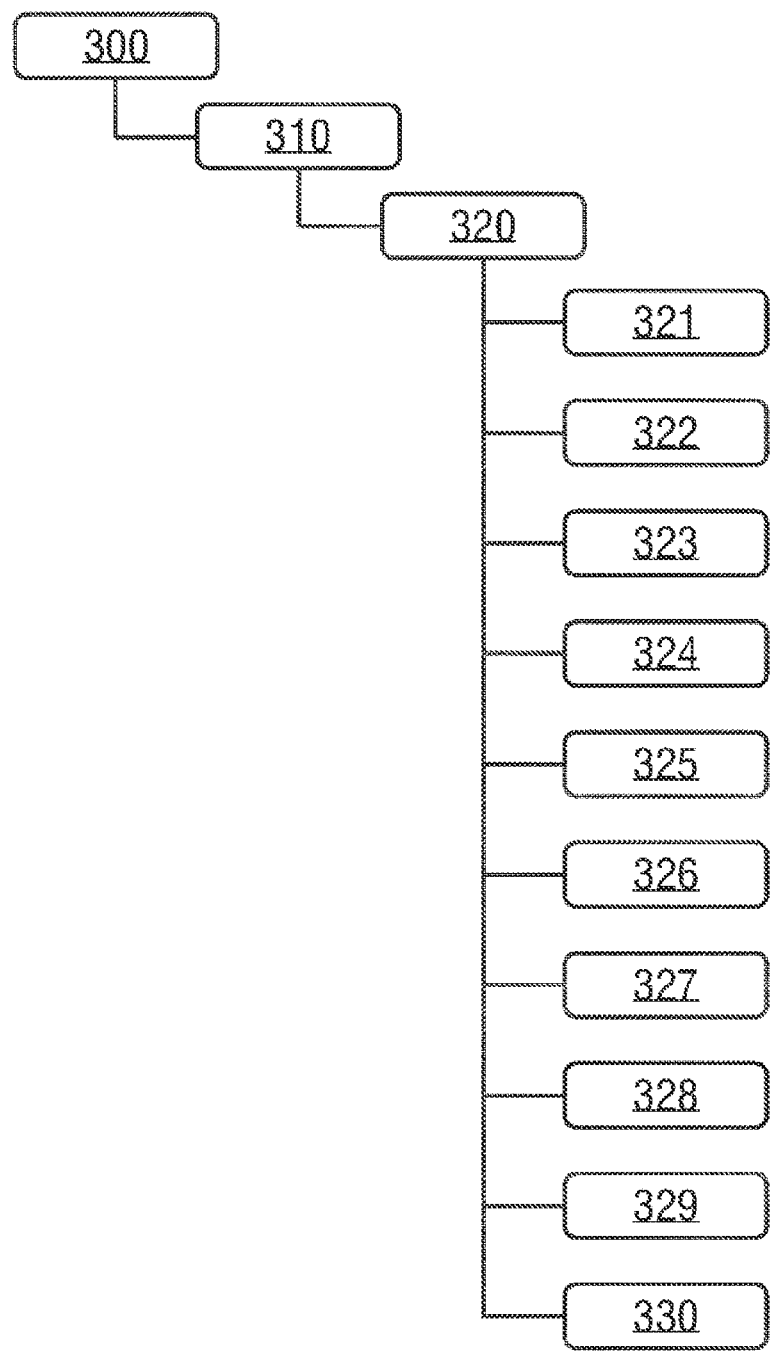
FIG. 3C is a schematic diagram of an example of an extended variable attribute of an exemplary variable in an Internet-of-things model incorporating teachings of the present disclosure.

In some embodiments, an extended variable attribute may further comprise additional variable attributes. In some embodiments, the additional variable attributes are determined on the basis of the application scenarios of virtual Internet-of-things devices. Correspondingly, before performing variable attribute expansion, the method may further comprise: determining additional variable attributes on the basis of the application scenarios of virtual Internet-of-things devices. Then, additional variable attributes may or may not be the same, depending on specific application scenarios and specific variables. FIG. 3C is a schematic diagram of an example of extended variable attributes of an exemplary variable in an Internet-of-things model incorporating teachings of the present disclosure. In the example shown in FIG. 3C, the additional variable attributes are "algorithm" 329 and "formula" 330, such as "parameter" and "amplitude" required to generate a cosine curve, and the applicable scenario may be, for example, use in the simulation of communication signals or physical simple harmonic vibrations.

Again referring to FIG. 1, at the block 130, variable link relations and variable link processing rules for the extended Internet-of-things models are configured to obtain an Internet-of-things model configuration file. In some embodiments, variable link relations are used to indicate which variables need to be connected to which variables in an Internet-of-things model. In variable linking, the value of the variable at the link start end is sent to the variable at the link termination end. In addition, variable link relations are used to indicate the sequence of data generated during a simulation test. A variable link processing rule is used to indicate, for the value of the variable at the start end of each variable link, which processing rule is used to obtain the value of the variable at the termination end. In some embodiments, a variable link processing rule may be an expression or a program script. In some embodiments, the variable link relations include variable link relations between variables in the same Internet-of-things model and/or variable link relations between variables in different Internet-of-things models.

In some embodiments, a variable link relation may comprise a one-to-many variable link relation; a one-to-one variable link relation; and/or a many-to-one variable link relation. In other words, it may be a variable link relation between one variable and a plurality of variables, a variable link relation between one variable and one variable, and a variable link relation between a plurality of variables and one variable.

Figure 4:
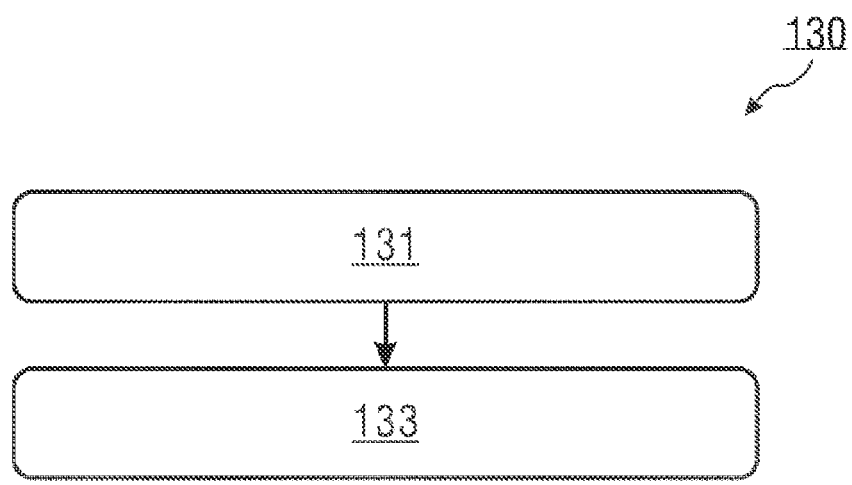
FIG. 4 is a flow chart of an example of a process for configuring variable link relations and variable link processing for an Internet-of-things model incorporating teachings of the present disclosure.

FIG. 4 is a flow chart of an example of a process for configuring variable link relations and variable link processing for an Internet-of-things model incorporating teachings of the present disclosure. As shown in FIG. 4, at the block 131, in response to the completion of the variable attribute expansion at the block 120, a model configuration interface is presented.

Then, at the block 133, variable link relations and variable link processing rules for the Internet-of-things models are configured through the model configuration interface, so as to obtain an Internet-of-things model configuration file. For example, variable link relations of an Internet-of-things model may be configured by manual linking (for example, dragging), and configuration of processing rules may be completed by inputting corresponding variable link processing rules in the variable link processing rule input box.

Figure 5:
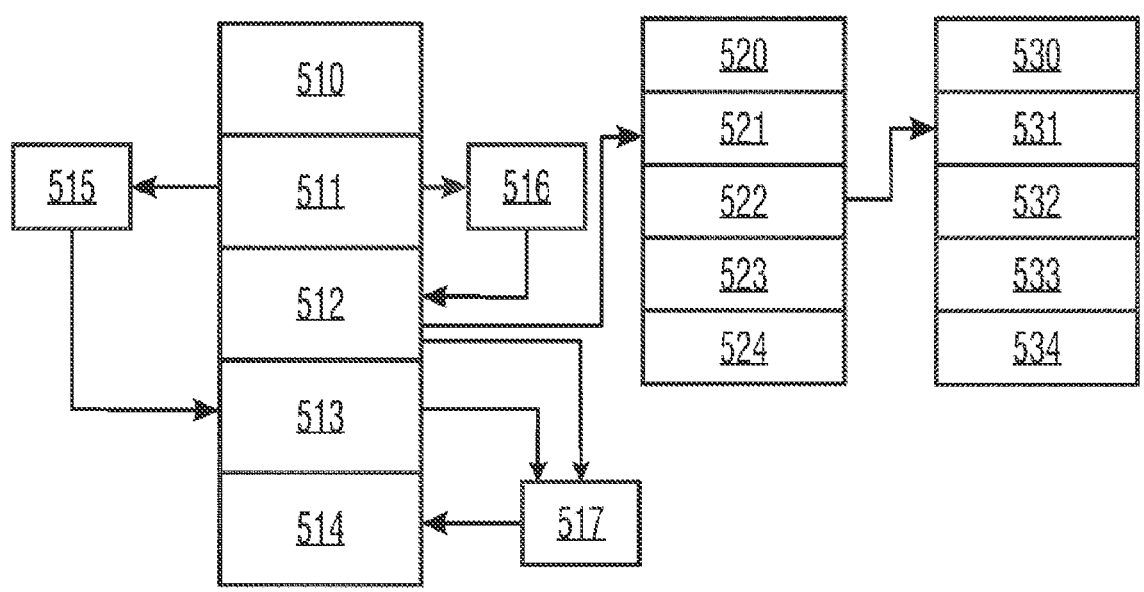
FIG. 5 is an exemplary schematic diagram of an example process for configuring variable link relations and variable link processing rules for an Internet-of-things model incorporating teachings of the present disclosure.

FIG. 5 is an exemplary schematic diagram of a process for configuring variable link relations and variable link processing rules for an Internet-of-things model incorporating teachings of the present disclosure. In FIG. 5, "Workstations1" 510, "Workstations2" 520 and "Workstations3" 530 respectively represent 3 Internet-of-things models, each Internet-of-things model representing a workstation in a production line. The variables "input_item" (511, 521, 531), "output_item" (512, 522, 532), "total_item" (513, 523, 533) and "FPY" (514, 524, 534) are Key Performance Indicators (KPIs) on the workstations.

There may be link relations between the variables "input_item", "output_item", "total_item" and "FPY" in each Internet-of-things model and between different Internet-of-things models. As shown in FIG. 5, in the Internet-of-things model "Workstations1", there is a variable link between the variables "input_item" and "total_item", and the variable link processing rule for the variable link is "total_item=input_item" 515. There is a variable link between the variables "input_item" and "output_item", and the variable link processing rule for the variable link is "output_item=input_item" 516. There is a variable link among the variables "output_item", "total_item" and "FPY", and the variable link processing rule for the variable link is "FPY=output_item/input_item" 517. In addition, there is a variable link between the variable "output_item" of the Internet-of-things model "Workstations1" and the variable "input_item" of the Internet-of-things model "Workstations2", which means that the variable "output_item" of the Internet-of-things model "Workstations1" is linked to the variable "input_item" of the Internet-of-things model "Workstations2", and there is no variable link processing rule for this variable link, which means direct transmission without processing. There is a variable link between the variable "output_item" of the Internet-of-things model "Workstations2" and the variable "input_item" of the Internet-of-things model "Workstations3", which means that the variable "output_item" of the Internet-of-things model "Workstations2" is linked to the variable "input_item" of the Internet-of-things model "Workstations3", and there is no variable link processing rule for this variable link, which means direct transmission without processing. Using the above processing method, variable link relations and variable link processing rules may be configured by means of a graphical interface, which makes the configuration of variable link relations and variable link processing rules more convenient and intuitive.

Again referring to FIG. 1, after an Internet-of-things model configuration file is obtained as described above, at the block 140, a second number of virtual Internet-of-things devices is obtained on the basis of a virtual physical network device architecture by using the Internet-of-things model configuration file, which may be the same as the first number, and thus one virtual Internet-of-things device is generated for each Internet-of-things model. In another example of the present invention, the second number may be the number of real Internet-of-things devices in the Internet-of-things solution, and thus the number of virtual Internet-of-things devices generated for each Internet-of-things model is the same as the number of corresponding real Internet-of-things devices in the Internet-of-things solution. Alternatively, in another example of the present invention, the second number may be a number between the first number and the number of real Internet-of-things devices in the Internet-of-things solution.

Figure 6:
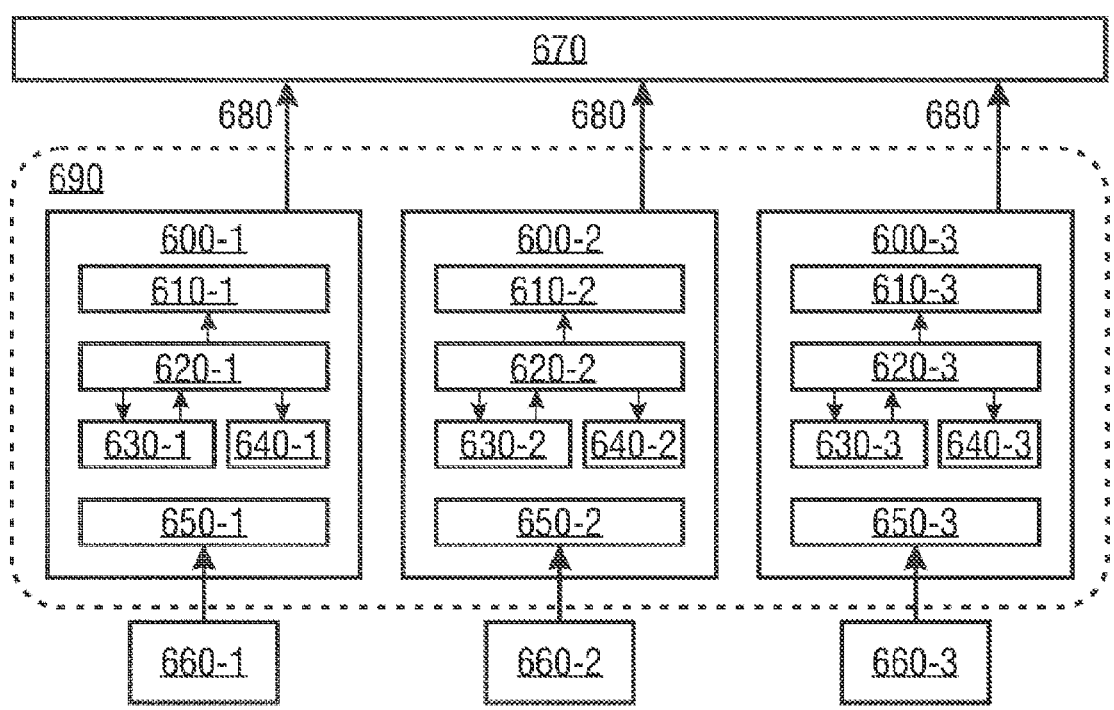
FIG. 6 is an exemplary schematic diagram of an example virtual Internet-of-things device architecture incorporating teachings of the present disclosure.

FIG. 6 is an exemplary schematic diagram of a virtual Internet-of-things device architecture 600 incorporating teachings of the present disclosure. As shown in FIG. 6, the virtual Internet-of-things device architecture 600 may comprise a cloud communication module 610, a model variable space and message queue 620, a rule execution engine 630, a data synchronization module 640, and a configuration file update processing module 650.

The cloud communication module 610 is configured to perform communication between a virtual Internet-of-things device and an Internet-of-things cloud platform. The model variable space and message queue 620 is configured to store variables in the Internet-of-things model corresponding to the virtual Internet-of-things device (that is, extended variables of the Internet-of-things model), and to provide a message queue service between other components of the virtual Internet-of-things device and other virtual Internet-of-things devices.

The rule execution engine 630 is configured to process data obtained from a message queue according to a variable link processing rule. The data synchronization module 640 is configured to synchronize a data processing result to the message queue of the linked virtual Internet-of-things device.

The configuration file update processing module 650 is configured to receive a Internet-of-things model configuration file, parse the received Internet-of-things model configuration file, and distribute the parsed Internet-of-things model configuration to corresponding components in the virtual Internet-of-things device architecture.

In some embodiments, after the virtual Internet-of-things device architecture 600 receives the Internet-of-things model configuration file for the Internet-of-things model, virtual Internet-of-things devices may be generated on the basis of the Internet-of-things model configuration file, for example, as shown in FIG. 6, wherein, after the configuration 660-1 for Workstation1, the configuration 660-2 for Workstation2, and the configuration 660-3 for Workstation3 are received, virtual Internet-of-things devices 600-1, 600-2 and 600-3 are generated. In addition, during a simulation test, the virtual Internet-of-things devices 600-1, 600-2 and 600-3 generate simulation data 680, which is then supplied to the cloud platform 670. In addition, the generated virtual Internet-of-things devices 600-1, 600-2 and 600-3 are stored in the virtual Internet-of-things device space 690.

In some embodiments, the second number may be the number of virtual Internet-of-things devices generated from user Internet-of-things models. For example, in the model configuration interface, for each Internet-of-things model, an area for inputting the number of virtual Internet-of-things devices to be generated may be set. For each Internet-of-things model, a user can, in the area for inputting the number of virtual Internet-of-things devices to be generated input, a desired number of virtual Internet-of-things devices to be generated.

In some embodiments, the method may further comprise: deploying the generated second number of virtual Internet-of-things devices into a simulated environment to complete a simulation test of the Internet-of-things solution. For example, the generated second number of virtual Internet-of-things devices may be deployed into a container image in a machine (for example, a computer or computing device) used to perform a simulation test, and then the second number of virtual Internet-of-things devices may be triggered (run) by the machine to generate simulated data, and the simulated data is then supplied to an Internet-of-things cloud platform to perform a simulation test on the Internet-of-things solution. In some embodiments, various suitable container deployment tools (for example, Kubernetes) may be used to implement the above-described deployment of virtual Internet-of-things devices. In some embodiments, each virtual Internet-of-things device may be deployed into a corresponding container if the second number is equal to the number of real Internet-of-things devices in the Internet-of-things solution. In some embodiments, when the second number is smaller than the number of real Internet-of-things devices in the Internet-of-things solution, the generated virtual Internet-of-things devices may be reused for deployment into corresponding containers.

Figure 7:
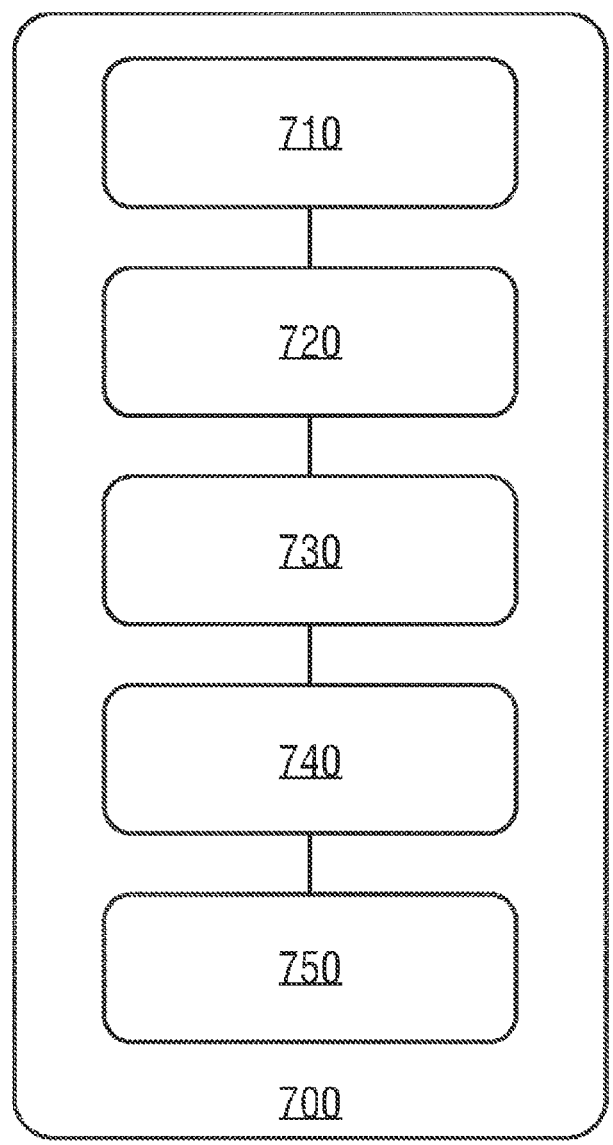
FIG. 7 is a block diagram of an example virtual device generating apparatus for generating a virtual Internet-of-things device on the basis of an Internet-of-things model of an Internet-of-things solution incorporating teachings of the present disclosure.

FIG. 7 is a block diagram of a virtual device generating apparatus 700 for generating a virtual Internet-of-things device on the basis of an Internet-of-things model incorporating teachings of the present disclosure. As shown in FIG. 7, the virtual device generating apparatus 700 comprises a model acquisition unit 710, a variable attribute expansion unit 720, a model configuration unit 730 and a virtual device generating unit 740.

The model acquisition unit 710 is configured to obtain a first number of Internet-of-things models of an Internet-of-things solution. For the operation of the model acquisition unit 710, references may be made to the operation at the block 110 described above with reference to FIG. 1.

The variable attribute expansion unit 720 is configured to subject the variables in the first number of Internet-of-things models to variable attribute expansion to add an extended variable attribute to the variable, wherein the variable subjected to variable attribute expansion is capable of data simulation. For the operation of the variable attribute expansion unit 720, references may be made to the operation at the block 120 described above with reference to FIG. 1 and the operations described with reference to FIG. 2 and FIG. 3A-3C.

The model configuration unit 730 is configured to configure variable link relations and variable link processing rules for the extended Internet-of-things models, so as to obtain an Internet-of-things model configuration file.

In some embodiments, there may be link relations and/or variable link relations between variables in different Internet-of-things models. For the operation of the model configuration unit 730, references may be made to the operation at the block 130 described above with reference to FIG. 1 and the operations described with reference to FIG. 4 and FIG. 5.

The virtual device generating unit 740 is configured to generate a second number of virtual Internet-of-things devices on the basis of a virtual physical network device architecture by using an Internet-of-things model configuration file. For the operation of the virtual device generating unit 740, references may be made to the operation at the block 140 described above with reference to FIG. 1 and FIG. 6.

Figure 8:
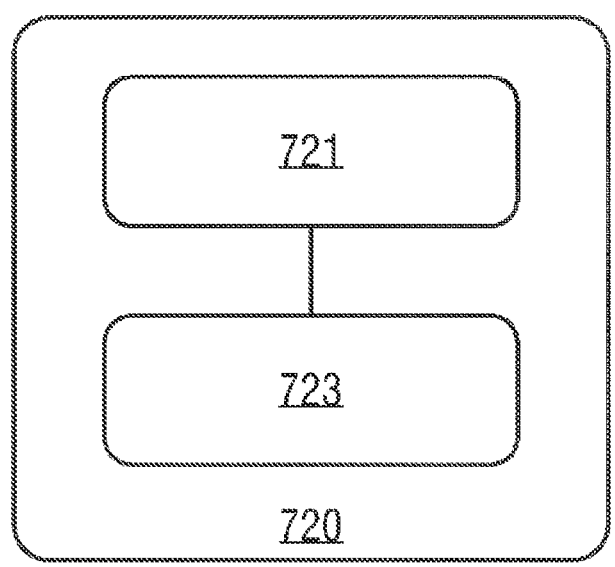
FIG. 8 is a block diagram of an example of a variable attribute expansion unit incorporating teachings of the present disclosure.

FIG. 8 is a block diagram of an example of the variable attribute expansion unit 730 incorporating teachings of the present disclosure. As shown in FIG. 8, the variable attribute expansion unit 730 comprises a variable configuration interface presenting module 731 and a variable attribute expansion module 733. The variable configuration interface presenting module 731 is configured to present a variable configuration interface that has an inherent variable attribute presentation area and an extended variable attribute input area, the inherent variable attribute presentation area presenting the inherent variable attributes of the variables in the first number of Internet-of-things models.

The variable attribute expansion module 733 is configured to receive the extended variable attributes of each variable inputted through the extended variable attribute input area, so as to realize variable attribute expansion, the expanded variable being capable of data simulation.

Figure 9:
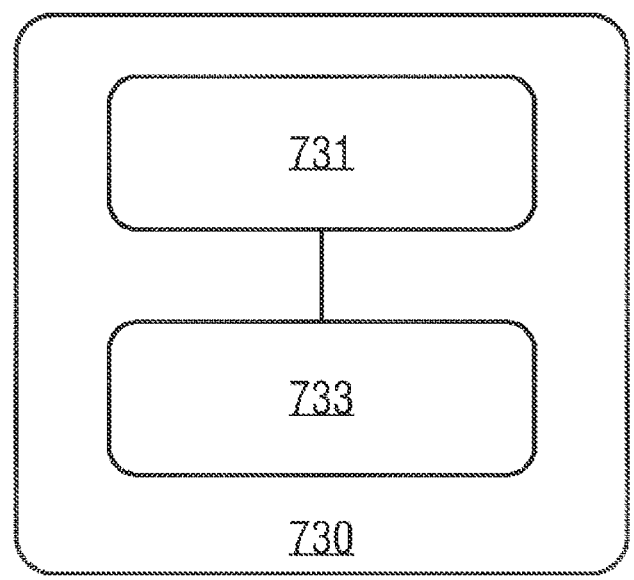
FIG. 9 is a block diagram of an example of a model configuration unit incorporating teachings of the present disclosure.

FIG. 9 is a block diagram of an example of the model configuration unit 730 incorporating teachings of the present disclosure. As shown in FIG. 9, the model configuration unit 730 comprises a model configuration interface presenting module 731 and a model configuration module 733. The model configuration interface presenting module 731 is configured to present a model configuration interface in response to completion of variable attribute expansion. For the operation of the model configuration interface presenting module 731, references may be made to the operation at the block 131 described above with reference to FIG. 4.

The model configuration module 733 is configured to receive the variable link relations and variable link processing rules for the Internet-of-things models configured through the model configuration interface, so as to obtain an Internet-of-things model configuration file. For the operation of the model configuration module 733, references may be made to the operation at the block 133 described above with reference to FIG. 4.

In some embodiments, the extended variable attributes further comprise additional variable attributes. Correspondingly, the virtual device generating apparatus 700 may further comprise an additional variable attribute determining unit (not shown). The additional variable attribute determining unit is configured to determine the additional variable attributes on the basis of application scenarios of virtual Internet-of-things devices.

In some embodiments, the virtual device generating apparatus 700 may further comprise a virtual device deploying unit feeding into a simulation environment for a simulation test on the Internet-of-things solution.

Embodiments of methods and/or apparatuses for generating a virtual Internet-of-things device on the basis of an Internet-of-things model of an Internet-of-things solution incorporating teachings of the present disclosure have been described above with reference to FIG. 1 to FIG. 9. The above-described virtual device generating apparatus may be implemented by hardware, or may be implemented by software or a combination of hardware and software.

Figure 10:
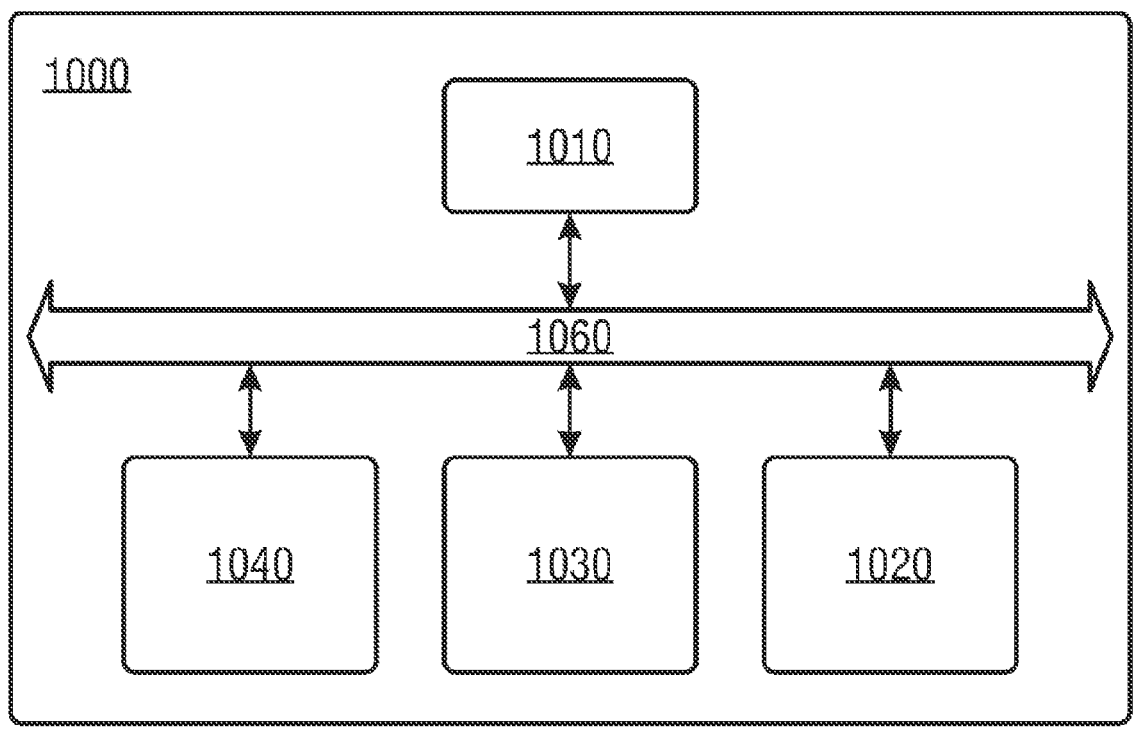
FIG. 10 is a block diagram of an example computing device for generating a virtual Internet-of-things device on the basis of an Internet-of-things model of an Internet-of-things solution incorporating teachings of the present disclosure.

FIG. 10 is a block diagram of a computing device 1000 for generating a virtual Internet-of-things device on the basis of an Internet-of-things model of an Internet-of-things solution incorporating teachings of the present disclosure. As shown in FIG. 10, the computing device 1000 may comprise at least one processor 1010, a memory (for example, a non-volatile memory) 1020, internal storage 1030, and a communication interface 1040, and the at least one processor 1010, the memory 1020, the internal storage 1030, and the communication interface 1040 are interconnected via a bus 1060. At least one processor 1010 executes at least one computer-readable instruction stored or encoded in the memory (that is, the above-described element implemented by software).

In some embodiments, an computer-executable instruction is stored in the memory and, when executed, causes at least one processor 1010 to: obtain a first number of Internet-of-things models of an Internet-of-things solution; subject a variable in the first number of Internet-of-things models to variable attribute expansion to add an extended variable attribute to the variable, wherein the variable subjected to variable attribute expansion is capable of data simulation; configure variable link relations and variable link processing rules for the extended Internet-of-things models to obtain an Internet-of-things model configuration file; and obtain a second number of virtual Internet-of-things devices on the basis of a virtual physical network device architecture by using the Internet-of-things model configuration file, wherein the variable link relations include variable link relations between variables in the same Internet-of-things model and/or variable link relations between variables in different Internet-of-things models.

In some embodiments, a computer-executable instruction stored in the memory, when executed, causes at least one processor 1010 to perform the operations and functions described above in conjunction with FIGS. 1-9 in various embodiments of the teachings of the present disclosure.

In some embodiments, a machine-readable medium may have a machine-executable instruction (that is, the above-described element implemented by software) that, when executed by a machine, causes the machine to perform the operations and functions described above in conjunction with FIGS. 1-9 in various embodiments of the teachings of the present disclosure.

In some embodiments, a computer program comprises an computer-executable instruction including operations and functions described above in conjunction with FIGS. 1-9 in various embodiments. In some embodiments, a computer program product is provided, comprising a computer-executable instruction that, when executed, causes at least one processor to perform the operations and functions described above in conjunction with FIGS. 1-9 in various embodiments.

While exemplary embodiments have been described above in conjunction with specific embodiments illustrated by the drawings, the embodiments are not all embodiments that may be implemented or fall within the protection scope defined by the claims. The term "exemplary" used throughout this description means "serving as an example, instance, or illustration", instead of implying being "preferred" or "advantageous" over other embodiments. Specific embodiments include specific details for the purpose of providing an understanding of the described techniques. However, these techniques may be implemented without these specific details. In some examples, in order to avoid causing any difficulties in understanding the concepts of the described embodiments, well-known structures and devices are shown in the form of block diagrams.

The preceding description of the present disclosure is provided to allow those of ordinary skill in the art to implement or use the present disclosure. It is readily apparent to those of ordinary skill in the art that various modifications may be made to the embodiments described herein, and that the general principles defined herein may also be applied to other variants without departing from the scope of protection of the present disclosure. Therefore, instead of being limited to the examples and designs described herein, the scope is consistent with the widest scope that conforms to the principles and novel characteristics disclosed herein.

What is claimed is:

1. A method for generating a virtual Internet-of-things device on the basis of an Internet-of-things model, the method comprising:
    obtaining a first number of Internet-of-things models with a model acquisition unit for an Internet-of-things solution;
    subjecting a variable in the first number of Internet-of-things models to variable attribute expansion with a variable attribution unit to add an extended variable attribute to the variable, wherein the variable subjected to variable attribute expansion is capable of data simulation;
    configuring variable link relations and variable link processing rules for the extended Internet-of-things models with a model configuration unit to obtain an Internet-of-things model configuration file; and
    obtaining a second number of virtual Internet-of-things devices on the basis of a virtual physical network device architecture by using the Internet-of-things model configuration file;
    wherein the variable link relations include variable link relations between variables in the same Internet-of-things model and/or variable link relations between variables in different Internet-of-things models;
    wherein subjecting a variable in the first number of Internet-of-things models to variable attribute expansion to add an extended variable attribute to the variable comprises:
        presenting a variable configuration interface that has an inherent variable attribute presentation area and an extended variable attribute input area, the inherent variable attribute presentation area presenting the inherent variable attributes of the variables in the first number of Internet-of-things models; and
        receiving the extended variable attributes of each variable inputted through the extended variable attribute input area, so as to realize variable attribute expansion, the expanded variable being capable of data simulation.

2. The method as claimed in claim 1, wherein the extended variable attribute comprises at least one variable attribute selected from the group consisting of:
    a data read cycle, a data range, and a simulation mode.

3. The method as claimed in claim 2, wherein the extended variable attribute further comprises additional variable attributes determined on the basis of application scenarios of virtual Internet-of-things devices.

4. The method as claimed in claim 1, wherein configuring variable link relations and variable link processing rules for the Internet-of-things models to obtain an Internet-of-things model configuration file comprises:
    presenting a model configuration interface in response to completion of variable attribute expansion; and
    receiving the variable link relations and variable link processing rules for the Internet-of-things models configured through the model configuration interface to obtain an Internet-of-things model configuration file.

5. The method as claimed in claim 1, wherein the variable link processing rule comprises an expression or a program script.

6. The method as claimed in claim 1, wherein the variable link relation comprises one or more relations selected from the group consisting of:
    a one-to-many variable link relation;
    a one-to-one variable link relation; and
    a many-to-one variable link relation.

7. The method as claimed in claim 1, further comprising deploying the generated second number of virtual Internet-of-things devices into a simulated environment to complete a simulation test of the Internet-of-things solution.

8. An apparatus for generating a virtual Internet-of-things device on the basis of an Internet-of-things model, the apparatus comprising:
    a model acquisition unit configured to obtain a first number of Internet-of-things models of an Internet-of-things solution;
    a variable attribute expansion unit configured to subject a variable in the first number of Internet-of-things models to variable attribute expansion to add an extended variable attribute to the variable, wherein the variable subjected to variable attribute expansion is capable of data simulation;
    a model configuration unit configured to configure variable link relations and variable link processing rules for the extended Internet-of-things models to obtain an Internet-of-things model configuration file; and
    a virtual device generating unit configured to generate a second number of virtual Internet-of-things devices on the basis of a virtual physical network device architecture by using the Internet-of-things model configuration file;
    wherein the variable link relations include variable link relations between variables in the same Internet-of-things model and/or variable link relations between variables in different Internet-of-things models;
    wherein the variable attribute expansion unit comprises:
        a variable configuration interface presenting module configured to present a variable configuration interface that has an inherent variable attribute presentation area and an extended variable attribute input area, the inherent variable attribute presentation area presenting the inherent variable attributes of each variable in the first number of Internet-of-things models; and a variable attribute expansion module configured to receive the extended variable attributes of each variable inputted through the extended variable attribute input area, so as to realize variable attribute expansion, the expanded variable being capable of data simulation.

9. The apparatus as claimed in claim 8, wherein the extended variable attribute comprises at least one attribute selected from the group consisting of: a data read cycle, a data range, and a simulation mode.

10. The apparatus as claimed in claim 9, wherein:
the extended variable attribute further comprises additional variable attributes; and
the apparatus further comprises an additional variable attribute determining unit configured to determine the additional variable attributes on the basis of application scenarios of virtual Internet-of-things devices.

11. The apparatus as claimed in claim 8, wherein the model configuration unit comprises:
a model configuration interface presenting module configured to present a model configuration interface in response to completion of variable attribute expansion; and
a model configuration module configured to receive the variable link relations and variable link processing rules for the Internet-of-things models configured through the model configuration interface, so as to obtain an Internet-of-things model configuration file.

12. The apparatus as claimed in claim 8, further comprising a virtual device deploying unit configured to deploy the generated second number of virtual Internet-of-things devices into a simulation environment for a simulation test on the Internet-of-things solution.

13. A computing device comprising:
a processor, and
a memory coupled to the processor, the memory storing an instruction that, when executed by the processor, causes the processor to perform the method as claimed in claim 1.

* * * * *